(12) United States Patent
Farrow et al.

(10) Patent No.: US 6,295,325 B1
(45) Date of Patent: Sep. 25, 2001

(54) FIXED CLOCK BASED ARBITRARY SYMBOL RATE TIMING RECOVERY LOOP

(75) Inventors: Cecil William Farrow, Highland; Daniel J. Udovic, Aberdeen, both of NJ (US); Vahid Marandi, Mission Viejo, CA (US); Mohammad Shafiul Mobin, Whitehall, PA (US); Kaylan Mondal, Berkeley Heights; Kai-Chuen Wong, Edison, both of NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/114,949

(22) Filed: Jul. 14, 1998

Related U.S. Application Data

(60) Provisional application No. 60/065,855, filed on Nov. 14, 1997.

(51) Int. Cl.[7] ....................................................... H03D 3/18
(52) U.S. Cl. ............................................................... 375/327
(58) Field of Search .................................... 375/327, 324

(56) References Cited

U.S. PATENT DOCUMENTS

| 4,755,761 | * | 7/1988 | Ray Jr. ............................... 329/323 |
| 4,866,647 |   | 9/1989 | Farrow . |
| 5,495,203 | * | 2/1996 | Harp et al. ............................ 329/306 |
| 6,005,640 | * | 12/1999 | Strolle et al. ......................... 348/726 |

OTHER PUBLICATIONS

C.W. Farrow, "A Continuously Variable Digital Delay Element", IEEE, 1988, pp. 2641–2645.
Tony Kirke, "Interpolation, Resampling, and Structures for Digital Receivers", Communication Systems Design, Jul. 1998, pp. 43–49.

* cited by examiner

Primary Examiner—Chi Pham
Assistant Examiner—Kevin M. Burd
(74) Attorney, Agent, or Firm—William H. Bollman

(57) ABSTRACT

A QAM data signal timing recovery loop feedback element provides a fixed sampling time offset adjustment to two continuously variable digital rate interpolators/decimators to produce a quadrature output stream at a programmed rational rate multiple of the actual baud rate of the received data signal. The continuously variable digital rate interpolators/decimators are configured at startup so as to produce output streams at the same programmed rational rate multiple of the nominal baud rate of the anticipated received data signal, assuming the fs sample timing offset adjustment stream provided by the timing recovery feedback element to be identically 0. The "nominal" fixed sampling rate fs of the received analog input signal need not be rationally related to the nominal baud rate of the anticipated received data signal.

24 Claims, 3 Drawing Sheets

FIXED CLOCK BASED ARBITRARY SYMBOL RATE TIMING RECOVERY LOOP

This application claims the benefit of Provisional No. 60/065,855 filed Nov. 14, 1997.

This application is similar to the following co-pending U.S. patent applications, all of which are expressly incorporated herein by reference:

U.S. patent application Ser. No.60/055,694, entitled "Variable Baudrate Demodulator", filed Jul. 15, 1997;

U.S. Pat. No. 6,081,565 allowed on Jun. 27, 2000 entitled "Amplitude Based Course Automatic Gain Control Circuit", filed Jul. 15, 1997;

U.S. patent application Ser. No. 09/019,402, entitled "Power Based Digital Automatic Gain Control Circuit", filed Jul. 15, 1997;

U.S. Pat. No. 6,108,375 allowed on Aug. 22, 2000 entitled "Equalization Circuit for Unknown QAM Constellation Size", filed Jul. 15, 1997;

U.S. patent application Ser. No. 60/052,572, entitled "Fixed Clock Based Arbitrary Symbol Rate Timing Recovery Loop", filed Jul. 15, 1997;

U.S. Pat. No. 6,081,565 allowed on Jun. 27, 2000 entitled "Fixed Clock Based Arbitrary Symbol Rate Timing Recovery Loop", filed Jul. 15, 1997;

U.S. patent application Ser. No. 60/052,572, entitled "Amplitude Based Coarse AGC", filed Jul. 15, 1997;

U.S. patent application Ser. No. 5,963,594 entitled "Vector Tracking Filter", filed Dec. 31, 1996;

U.S. Pat. No. 5,870,442 allowed on Nov. 5, 1999 entitled "Variable Baudrate Demodulator", filed Dec. 31, 1996; and U.S. patent application Ser. No. 09/114,948, entitled "Variable Baud Rate Demodulator", co-filed on even date herewith.

BACKGROUND OF THE INVENTION

1. Field of the Invention

This invention relates generally to timing of a received data stream. More particularly, it relates to a data signal timing recovery loop useful for establishing the symbol rate of an arbitrary received data signal using a fixed sampling clock.

2. Background of Related Art

High speed data transmission systems, e.g., modems, operate in general by modulating a high frequency carrier corresponding to a desired channel with a low frequency data signal of fixed baud rate. The modulated data signal is transmitted to a receiver, which demodulates the received high frequency modulated signal to recover the transmitted digital symbols at the far transmitter baud rate.

In such data transmission systems, the baud rate of the transmitting and receiving devices are generally fixed at a discrete level, and generally include a modulator and/or demodulator which operates at a fixed baud rate. Any fine adjustments which might be made in the baud rate of the receiver are typically made in the sampling rate of an analog-to-digital (A/D) converter sampling the incoming analog signal. However, these conventional baud rate adjustments are limited to just a few hundreds or thousands of parts per million of the baud rate, and are not able to adjust through a wide range of baud rates without requiring additional and/or different filtering for each different baud rate. The need for additional and/or different filtering for each received baud rate is cumbersome and expensive to implement. Moreover, different receivers must be developed and manufactured for each expected baud rate.

There is a need for a data signal timing recovery loop operating on fixed clock rate (fs) digital samples of arbitrary baud rate data signals to produce digital samples streams synchronous to the baud rate of the arbitrary baud rate received data signal.

SUMMARY OF THE INVENTION

In accordance with the disclosed embodiments, a quadrature amplitude modulated (QAM) data signal timing recovery loop comprises a received data signal baud event estimator adapted to produce an fs sampling time offset value adjustment based on a statistical baud tone phase error estimate and a nominal received data signal baud rate parameter set at receiver startup time. Two continuously variable digital delay elements (CVDD) respond to the fs sampling time offset value producing interpolated samples at the appropriate rate based upon sets of closes neighbor samples in time of the received data signal, collected at the fixed A/D sampling rate, fs. The production rate of the interpolated sample stream is exactly equal to a system-programmed multiple of the actual received data signal baud rate.

In accordance with another aspect of the present invention, a timing recovery loop comprises a filter adapted to receive In-Phase and Quadrature components of a received signal and to provide filtering to produce filtered In-Phase components and filtered Quadrature components. Two complex value squarers are adapted to receive quadrature band edge filtered In-Phase and Quadrature components and produce first and second complex value squared outputs. Each of the two complex value streams produced contains a statistical discrete tone (complex phasor) of frequency precisely equal to the received data signal baud rate, among other unwanted energy artifacts. The two complex streams are added to cancel unwanted energy artifacts that reside in each individual complex stream due to any residual carrier frequency offset that may exist in the nominal carrier frequency demodulated received data signal. A de-rotating integrator is adapted to receive and de-rotate the first and second squared outputs, and to accumulate a squared complex signal. This de-rotating integrator demodulates and low pass filters the statistical baud tone phasor contained in the summed complex stream described above. A phase estimator is adapted to receive the demodulated and low pass filtered complex-valued baud tone and to generate a received data signal baud event phase error estimate. A phase locked loop is adapted to receive and track this phase error estimate, and an fs sampling time offset calculator is coupled to the output of the phase locked loop. The fs sampling time offset calculator outputs a fs sampling time offset value based upon the fs sampling time offset adjustment produced by the phase locked loop and a nominal received data signal baud rate parameter set at receiver startup time.

A demodulator in accordance with the principles of the present invention comprises an analog-to-digital converter adapted to receive an analog signal and produce digital samples at a first, fixed frequency fs. A digital demodulator is adapted to receive the digital samples and separate the digital samples into In-Phase and Quadrature components. The digital demodulator produces samples at the first frequency fs rate. Two continuously variable digital delay (CVDD) devices adjust the rate of representations of the In-Phase and Quadrature components to produce rate adjusted components at a second frequency. A decimator is adapted to decimate the rate adjusted components to produce decimated components at a third frequency, and a timing recovery loop feedback element is adapted to generate a fs sampling time offset value adjustment which is provided to an fs sampling time offset calculator that manages a pair of continuously variable interpolator/decimator elements.

A method of adjusting the output rate of the pair of continuously variable interpolator/decimator elements in accordance with the principles of the present invention comprises calculating an fs sampling time value adjustment based on an analysis of In-Phase components and Quadrature components corresponding to quadrature amplitude modulated samples, and calculating fs sampling time offset values and manufacturing continuously variable interpolator/decimator output events based upon the fs sampling time offset adjustment produced by the phase lock loop and a nominal received data signal baud rate parameter set at receiver startup time.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The disclosed embodiment of the present invention relates to a digital quadrature amplitude modulation (QAM) receiver that is capable of demodulation of a passband signal containing a digital signal having a baud rate which is anywhere in a wide range of possible baud rates. The input signal is sampled at a fixed rate fs, and an interpolator/decimator chain generates T/2 samples at twice the received data signal baud rate for use with a fractionally spaced adaptive equalizer.

Figure 1:
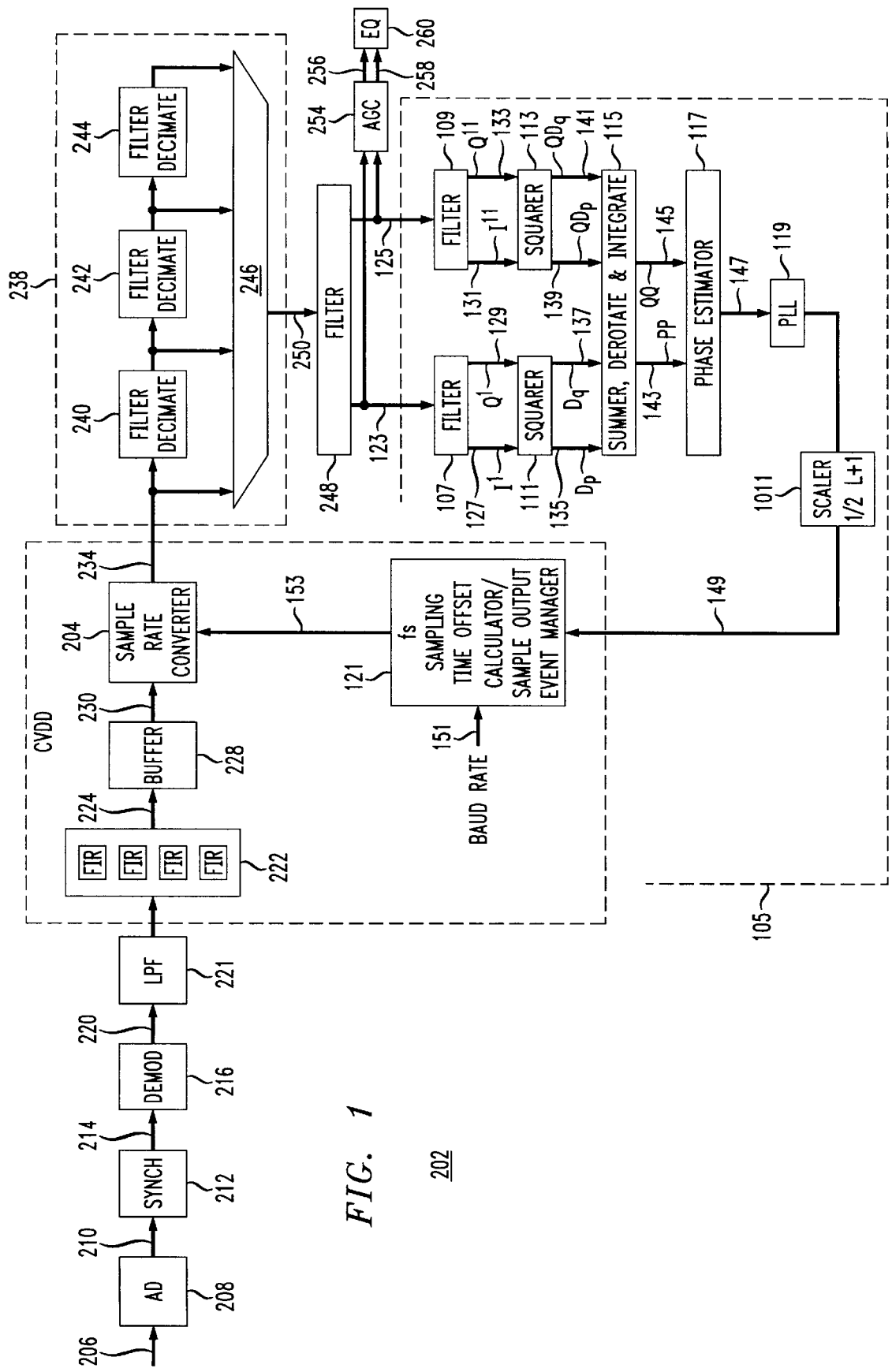
FIG. 1 is a simplified block diagram showing an embodiment of a demodulator incorporating a timing recovery loop in accordance with the principles of the present invention.

FIG. 1 is a simplified block diagram showing an embodiment of a demodulator 202 incorporating a timing recovery loop in a communication device, e.g., an integrated circuit based modem, in accordance with the principles of the present invention.

In particular, the demodulator 202 includes an A/D converter 208, a synchronizer 212, a demodulator circuit 216, a pair of low pass filters 221, a filter bank 222, two continuously variable interpolator/decimator circuits consisting of a buffer 228, sample rate converter 204, a multi-stage decimator 238, an fs sampling time offset calculator/sample output event manager circuit 121, a filter 248, and an automatic gain control unit 254.

An analog signal is received by the demodulator 202 on line 206 and sampled at a fixed rate fs by an analog-to-digital (A/D) converter 208 to produce a fixed rate of digital samples on line 210.

The synchronizer 212 receives the digital samples from line 210 and latches the digital samples for subsequent output in synchronism with a second clock source of identical frequency fs, but unknown phase with respect to the A/D fs sample clock. Output appears on line 214.

The demodulator circuit 216 receives the synchronized samples from line 214 and separates the synchronized samples into In-Phase components and Quadrature components, which are output in interleaved fashion on line 220. Alternatively, the In-Phase and Quadrature components can be output on separate data paths. However, by interleaving the In-Phase and Quadrature components, resource sharing can be employed without the need for multiplexers, thereby saving the cost of multiplexers, and also saving the cost of timing circuitry associated with multiplexers. Low pass filters 221 remove the high pass spectral images produced by the quadrature demodulation operation. Blocks 222, 228, 204 and 121 comprise two continuously variable digital interpolator/decimator elements.

The filter bank 222 includes, e.g., four filters, such as, e.g., finite impulse response (FIR) filters. The filter bank 222 receives low pass filtered in-phase and quadrature components of the quadrature demodulated signal from the demodulator circuit 216, e.g., in interleaved fashion from line 220, and outputs filtered in-phase components and filtered quadrature components, respectively, on line 224, e.g., in interleaved fashion.

The buffer 228 receives the filtered In-Phase components and filtered Quadrature components from line 224 and buffers the filtered In-Phase components and filtered Quadrature components in, for example, a first-in-first-out (FIFO) fashion.

The sample rate converter 204 receives the buffered in-phase and quadrature components, in interleaved fashion, via line 230 from buffer 228 and changes the rate of the samples to an arbitrary, programmable rate by interpolating or decimating as necessary, to produce rate changed components. The sample rate converter 204 responds to an fs sample time offset value received on line 153 and appropriate clock signals to produce a pair of interpolated/decimated output streams at the fs sampling time offset calculator/ output event manager controlled rate. The rate changed components are output on line 234.

The multi-stage decimator 238 includes, for example, three decimation units 240, 242 and 244, each providing a rate reduction factor of ½.

The filter 248 is optional based on the needs of the particular application. For a QAM data signal demodulator, the same coefficients used for an individual stage of the half-rate filter can be used for this set of filters to achieve compromise matched filtering of the baseband data signal to assist subsequent equalizer startup training.

An automatic gain control unit 254 produces gain adjusted components and outputs the gain adjusted components on lines 256 and 258 to the timing recovery feedback element and an external equalizer and carrier phase tracker circuit. A suitable automatic gain control unit 254 is described, for example, in co-pending U.S. patent application Ser. No. 09/019,402 filed Jul. 15, 1997 and entitled "Power Based Digital Automatic Gain Control Circuit", which is expressly incorporated herein by reference. The external equalizing unit detects symbols within the gain adjusted components and outputs the data symbols at the desired or target baud rate.

The demodulator 202 shown in FIG. 1 further includes a timing recovery loop feedback element 105. The timing recovery loop feedback element is required to develop an error signal to the fs sampling time offset calculator/sample output event manager so that the sample rate changer will generate output events in synchronism with data signaling events occuring at the far transmitter baud rate.

The timing recovery loop feedback element 105 receives signals from an automatic gain control (AGC) 254 through a first quadrature band edge filter pair 107 and a second quadrature band edge filter pair 109. The timing recovery loop 105 also includes a first squarer 111 and a second squarer 113 receiving signals from the filter pairs 107 and 109, respectively. The corresponding outputs of the complex value squarer circuits are added to cancel unwanted carrier offset signal energy components appearing in the individual squarer complex-valued output streams. The timing recovery loop feedback element 105 further includes a de-rotating integrator 115, a phase estimator 117, a phase lock loop (PLL) 119, an fs sampling time offset calculator/sample output event manager 121, which provides fs sampling time offset values via line 153, a scaler 1011, and appropriate clocking signals to the sample rate converter pair 204.

The sample rate converter pair 204 produces interpolated/decimated sample output streams based on the fs sampling time offset values on line 153 and appropriate clock signals provided by the fs sampling time offset calculator/sample output event manager 121. The stream of fs sampling time offset values identifies a stream of mathematical time instant offsets from the mathematical times of fs input sampling events occurring at the A/D converter 208. The corresponding clock signals generated by the fs sampling rate offset calculator/sample output event manager control the high speed clock cycles when output samples will be generated by the sample rate converter block using the current fs sampling time offset value on line 153. Pairs of sample rate converter output values will be generated using sets of received data signal samples collected at the numerically closest fs clock sampling instants in time. The rate at which these samples will be manufactured corresponds to a programmed multiple of the programmed nominal baud rate of the anticipated received signal. When the fs sampling time offset calculator/output event manager 121 is operated without the timing recovery feedback element error signal, the continuously variable interpolator/decimator block will produce signal sample pairs at a rate precisely equal to the programmed multiple of the programmed "nominal" baud rate. When block 121 is operated with an active timing recovery feedback element error signal, the continuously variable interpolator/decimator block will produce signal sample pairs at a rate precisely equal to the programmed multiple of the "actual" far transmitter data signal baud rate.

Interpolated components are output from the sample rate converter 204, e.g., in interleaved fashion in the disclosed embodiment, on line pair 234, at an output rate controlled by the fs sampling time offset calculator/output event manager 121.

The multi-stage decimator 238, which receives the interpolated components from the continuously variable interpolator/decimator block, comprises a plurality of decimator stages to provide programmably fixed amounts of decimation, e.g., programmable in powers of 2. For example, the disclosed embodiment includes three decimators 240, 242 and 244, each providing a decimation by 2, and a multiplexer 246 to programmably select for output from the multi-stage decimator 238 any of a decimation by 2 (stage 240 only), by 4 (stages 240 and 242) or a decimation by 8 (stages 240, 242 and 244). In the scaler 1011, L represents the number of stages of half rate filtering activated in the multi-stage decimator 238.

The multi-stage decimator 238 receives the interpolated components provided by the continuously variable interpolator/decimator on line 234, and outputs decimated components to filter 248 on line 250. According to the invention, the decimated components output on line 250 are typically programmed by selection of an appropriate number of stages 240–244 in the multi-stage decimator 238 and by loading the appropriate rate change value on line 151 to cause sample pairs on line pair 250 to occur at a frequency that is twice the nominal baud rate of the anticipated received data signal.

The components provided to the timing recovery loop feedback element 105 by the automatic gain control (AGC) unit 254 are also output to an external equalizer/carrier offset phase tracker used to generate received data symbols at the far transmitter baud rate. Thus, the demodulator front end 202 receives incoming signals on line 206, converts the incoming signals into digital samples through the A/D converter 208 at a fixed first frequency fs, and, in the absence of timing recovery loop feedback (i.e., open loop operation), produces quadrature baseband streams at a programmed multiple of the programmed nominal baud rate of the anticipated received data signal. When the timing recovery feedback element error signal is activated on line 149, the demodulator front end develops a QAM received signal baud tone phasor estimate and uses its measured phase evolution to adjust the programmed open-loop output rate of the demodulator front end so that it precisely corresponds to the programmed multiple of the "actual" received data signal baud rate, even though the sampling rate of analog-to-digital converter 208 is unrelated to the baud rate.

Operationally, the first quadrature band edge filter pair 107 in the timing recovery loop feedback element 105 receives automatic gain-controlled In-Phase components of the received QAM data signal on the input line 256 after passing through a compromise matched filter 248 from the multi-stage decimator 238 as shown in the example of FIG. 1. However, the timing recovery loop 105 may receive input from elements other than a filter and/or a multi-stage decimator 238 within the principles of the present invention. The timing recovery loop 105 of the present invention is functional with any digital system requiring timing recovery and including a component which can provide In-Phase components.

Similarly, the second quadrature band edge filter pair 109 receives automatic gain-controlled Quadrature components of the received QAM data signal on an input line 258.

Quadrature band edge filter pairs 107 and 109 are band pass filter pairs that function as Hilbert filter pairs in the fbaud/2 spectral vicinity. Both filters of each Hilbert pair have identical frequency amplitude response in the spectral vicinity about nominal fbaud/2, but one filter output within each pair produces a 90 degree phase shift of the signal frequency components that pass through it relative to the other filter's signal output in the spectral vicinity of nominal fbaud/2. For the purpose of this discussion, the operations performed by the individual filters of each Hilbert filter pair will be denoted as I and Q (in-phase and quadrature, respectively) splitting. Thus, the first filter 107 receives one input on line 123 but has two outputs, e.g., on lines 127 and 129, having spectral filtered In-Phase components. A first spectral filtered In-Phase component, provided on line 127, is designated I', and a second spectral filtered In-Phase component, provided on line 129, is designated Q'.

Similarly, the second filter 109 outputs spectral filtered Quadrature components on lines 131 and 133. A first spectral filtered Quadrature component, provided on line 131, is designated I", and a second spectral filtered Quadrature component, provided on line 133, is designated Q". The spectral filtered Quadrature components output from the second filter 109 are preferably delayed relative to the spectral filtered In-Phase components output from the first filter 107 on lines 127 and 129.

The first squarer 111 receives the spectral filtered In-Phase components I' and Q' on lines 127 and 129 and produces a first squared output provided on lines 135 and 137. The first squared output includes a real component on line 135 and an imaginary component on line 137. First squarer 111 performs the squaring operation on the combination of I' and Q' according to the following equation:

$$(I'+jQ')^2 = I'^2 + j2I'Q' + Q'^2 j^2$$

which reduces to:

$$(I'+jQ')^2 = (I'^2 - Q'^2) + j2I'Q'$$

The real component, $(I'^2-Q'^2)$, designated Dp, is provided on line 135, and the imaginary component, j2I'Q', designated Dq, is provided on line 137.

Second squarer 113 receives the spectral filtered quadrature components I" and Q" on lines 131 and 133 and produces a second squared output provided on lines 139 and 141. The second squared output includes a real component on line 139 and an imaginary component on line 141. Second squarer 113 performs the squaring operation on the combination of I" and Q" according to the following equation:

$$(I''+jQ'')^2 = I''^2 + j2I''Q'' + Q''^2 j^2$$

which reduces to:

$$(I''+jQ'')^2 = (I''^2 - Q''^2) + j2I''Q''$$

The real component, $(I''^2-Q''^2)$, designated QDp, is provided on line 139, and the imaginary component, j2I"Q", designated QDq, is provided on line 141. A complex value adder circuit is used to combine individual squarer circuit complex output streams to produce a single complex output stream $$psum+j\ qsum = (Dp+QDp) + j(Dq+QDq)$$

The psum sample stream appears on signal line 136 and the qsum sample stream appears on signal line 140. The two complex streams are added to cancel unwanted energy artifacts that reside in each individual complex stream due to any residual carrier frequency offset that may exist in the baseband complex data signal due to demodulating the received data signal by the nominal, rather than actual carrier frequency.

De-rotating integrator 115 receives the first squared output sum from line 136 and the second squared output sum from line 140 and produces first and second accumulated signals which are output on lines 143 and 145. As part of the accumulation process, de-rotating integrator 115 de-rotates the samples so that their vectors are aligned. The amount of de-rotation necessary depends on the sampling rate of the system, such as the modem, employing the timing recovery loop of the invention.

For example, if the system has a sampling rate of two samples per symbol, then every other sample must be rotated 180 degrees to align the samples. Alternatively, if the system has a sampling rate of three samples per symbol, each group of three consecutive samples includes a first sample that is rotated 120 degrees, a second sample that is rotated 240 degrees, and a third sample that is not rotated.

For example, presume two samples per symbol (i.e., the minimum required number of samples per symbol, as is known to one of ordinary skill in the art) are employed, the de-rotation function and the integration function can be performed simultaneously according to the following equations, where PPn represents the accumulated signal on line 143, and QQn represents the accumulated signal on line 145:

$$PPn = psum - PP(n-1)$$

$$QQn = qsum - QQ(n-1)$$

Or, in other words, for sample n, the signal on line 143 (PPn), is equal to the signal on line 136 (psum), plus the signal on line 139 (QDp), minus the previous value of the signal on line 143 (PP(n−1)). Similarly, the signal on line 145 (QQn), is equal to the signal on line 140 (qsum), plus the signal on line 141 (QDq), minus the previous value of the signal on line 145 (QQ(n−1)). By subtracting the previous value, each of these equations shifts the phase of the previously accumulated value 180 degrees to achieve alignment of the previously accumulated value with the n-th sample, and adds the magnitude of the n-th sample to the previously accumulated value.

Phase estimator 117 receives the accumulated signals PP and QQ from lines 143 and 145 and generates a phase error estimate which is provided on line 147. In one example, phase estimator 117 develops a phase error estimate based on an analysis of the sign bit of periodic values of QQ received on line 145. The period for which the values of QQ are utilized is related to the sampling frequency of the overall system. If the sampling frequency provides for three samples per symbol, then every third value of QQ is utilized. If the sampling frequency provides for two samples per symbol, then every other value of QQ is utilized. The objective is to track the sign of QQ values near the positive real axis, based on a goal of the overall system to maximize the real component (PP) and minimize the imaginary component (QQ).

Thus, presuming a two sample per symbol scenario, the phase estimator maintains a count based on the sign of every other QQ value, yielding one update to the count per symbol. The count will be incremented when the sign of a present QQ value is the same as the sign of a previously counted QQ value, indicating that the imaginary value did not cross the real axis, and will be decremented when the sign of the present QQ value differs from the sign of the previously counted QQ value, indicating a real axis crossing and proximity to convergence. The incrementing and decrementing steps may vary in magnitude. For example, the count may be incremented by a small value, such as one, when the signs are the same, and may be decremented by a larger value, such as eight, when the signs change.

Based on the count, phase estimator 117 outputs a phase error estimate on line 147, which is tracked by phase lock loop 119 and provided to sample epoch estimator 121 on line 149.

Figure 2:
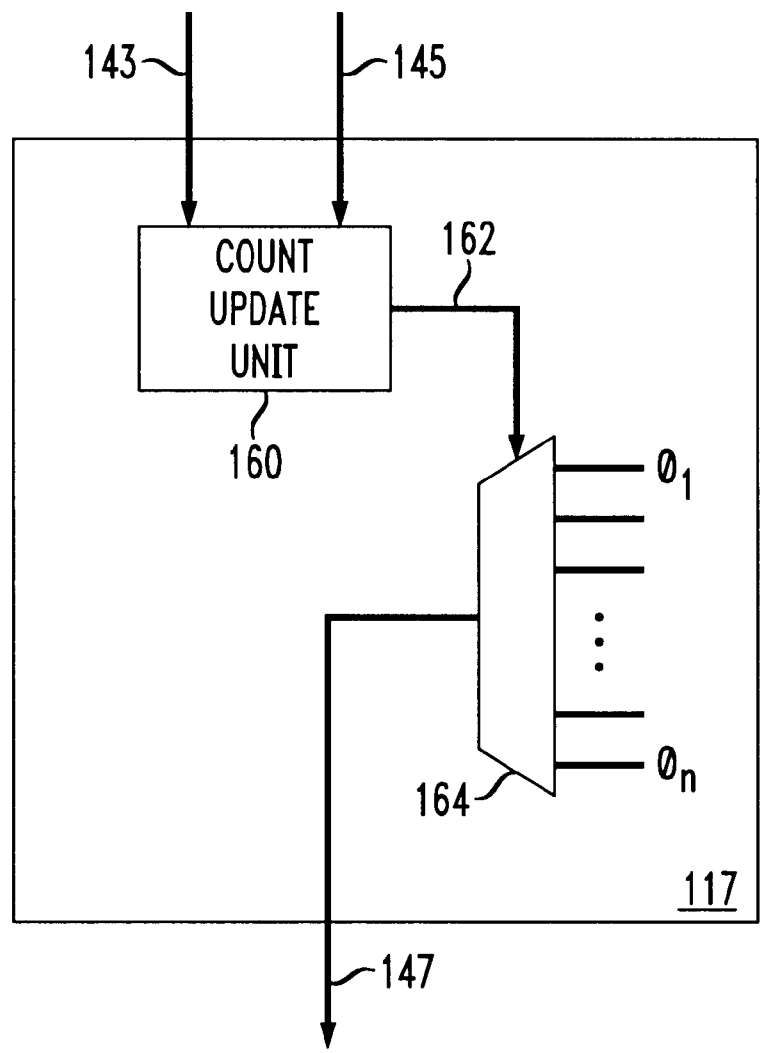
FIG. 2 is a simplified block diagram of an exemplary phase estimator for use in a timing recovery loop in accordance with the principles of the present invention.

FIG. 2 shows an example of an implementation of the phase estimator 117, including a count update unit 160 and a multiplexer 164.

In particular, the count update unit 160 is adapted to receive the accumulated signals PP and QQ from lines 143 and 145, to update the count and to provide the count as a multi-bit select value on line 162.

The multiplexer 164 is adapted to select from a plurality of inputs $\theta_1:\theta_n$, based on the count, and to output a scaled version of the same as an fs sampling time adjustment estimate to the fs sampling time offset calculator 121 via phase lock loop 119 (FIG. 1).

The values of $\theta_1$ through $\theta_n$ are preferably established according to a numbering regime employed in the overall system, such as a Q24 numbering regime, reflecting, for example, fractional values of $\frac{1}{8}$, $\frac{1}{16}$, ...$\frac{1}{512}$, $\frac{1}{1024}$, ... $\frac{1}{2}^n$, $\frac{1}{2}^{n+\Delta}$. Preferably, the multiplexer 164 selects small values of θ for small values of the count and large values of θ for large values of the count.

The fs sampling time adjustment calculator/sample output event manager 121 (FIG. 1) receives the value on line 149, which is a measure of fs sampling time offset adjustment, and also receives, e.g., on line 151, a rate change parameter determined by the nominal baud rate of the anticipated received signal. This parameter is set at demodulator startup time. When the fs sampling time offset calculator/output event manager 121 is operated without the timing recovery feedback element error signal, the continuously variable interpolator/decimator block will produce signal sample pairs at a rate precisely equal to the programmed multiple of the programmed "nominal" baud rate. When block 121 is operated with an active timing recovery feedback element error signal, the continuously variable interpolator/decimator block will produce signal sample pairs at a rate precisely equal to the programmed multiple of the "actual" far transmitter data signal baud rate. Details of the fs sampling time offset calculator/output event manager are provided in co-pending application "Variable Baud Rate Demodulator", filed on even date herewith.

In a preferred embodiment, a fast AGC would be included in the timing recovery feedback loop, and the equalizer signals 123 and 125 would become 256 and 258, respectively.

In the exemplary embodiment described above, the demodulator circuit 216, the filter bank 222, the buffer 228, the interpolator/decimator 204, the multi-stage decimator 238, and the optional half rate filter 248 operate on the In-Phase and Quadrature components in an interleaved fashion to share resources and thus provide savings through resource sharing. This is merely by way of example, and not of limitation. For instance, the In-Phase and Quadrature components can be operated on by way of separate signal paths with associated components. Similarly, in an alternative embodiment, instead of outputting separate signal paths, the filter 248 can output interleaved filtered components on a single path. In this case, additional resource sharing can be achieved by using only one of the filters 107 and 109, and/or only one of the squarers 111 and 113, thus utilizing interleaved signaling throughout the timing recovery loop 105.

Figure 3:
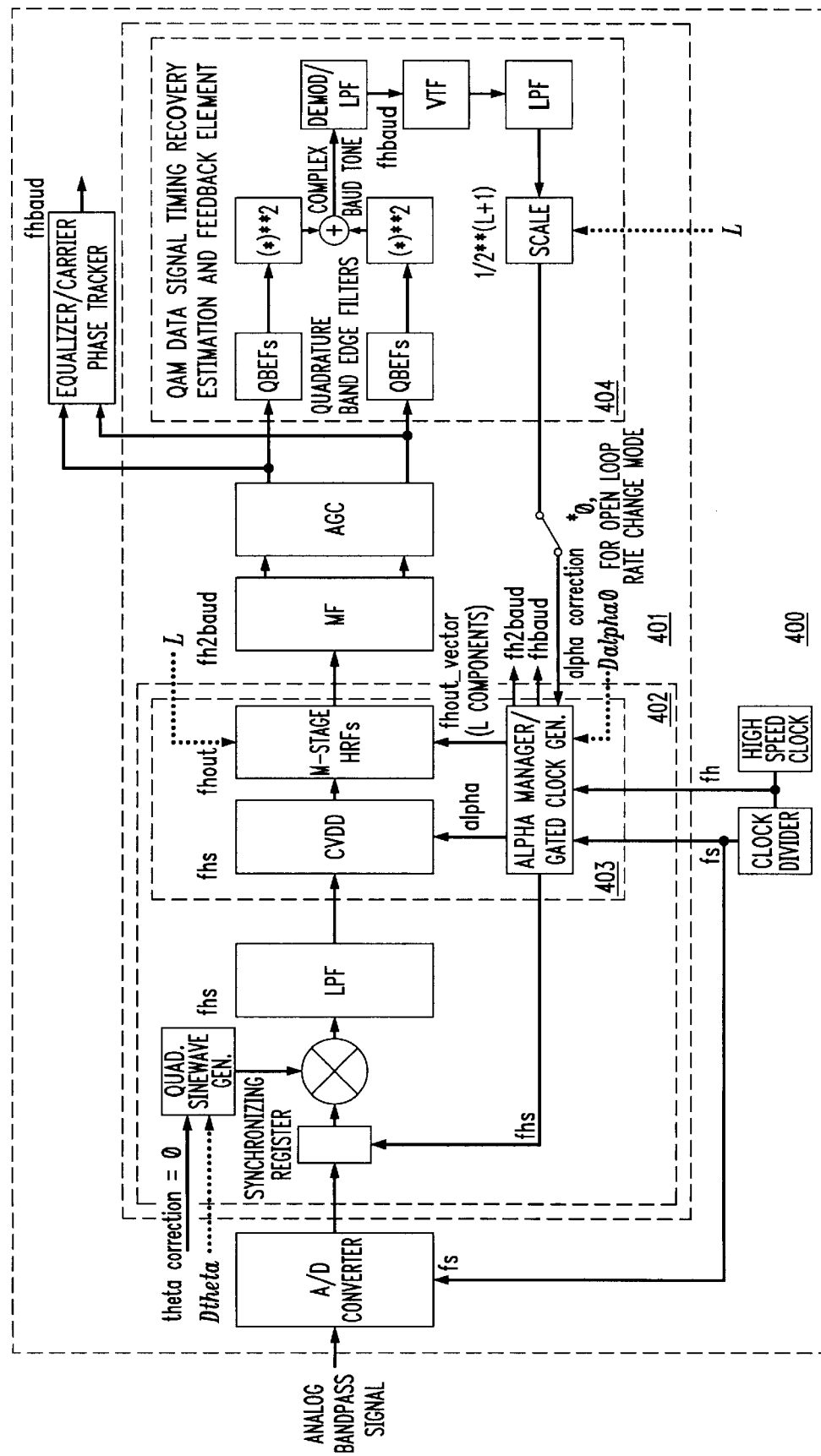
FIG. 3 shows another embodiment of a fixed sampling rate/variable baud rate QAM demodulator in accordance with the principles of the present invention.

FIG. 3 shows another embodiment of a fixed sampling rate/variable baud rate QAM demodulator in accordance with the principles of the present invention.

In particular, FIG. 3 shows the variable baud rate QAM demodulator generally at 400. The variable baud rate QAM demodulator includes a front end 401, a variable bandwidth channel tuner/variable output rate quadrature demodulator 402, a continuously variable digital rate interpolator/decimator 403, and a QAM data signal timing recovery feedback element and timing recovery loop 404.

In FIG. 3, the bolded blocks denote two instances, corresponding to In-Phase and Quadrature processing streams. Moreover, names beginning with the letters "fh" denote frequencies of the gating signals generated by the alpha manager/gated clock generator block. These gates determine the exact times and establish the rates for performing signal processing functions, all driven by "fh", the system's high speed clock. The term "alpha" is short hand notation for "fs sampling time offset". Bold vectors denote two stream instances, corresponding to In-Phase and Quadrature streams, except where noted. Symbols in italic denote parameters loaded by the system controller at demodulator startup time.

One difference between the embodiment shown in FIG. 1 and that shown in FIG. 3 is the placement of the AGC. Another is that the summer is explicitly shown in FIG. 3, whereas it is implicitly shown in the De-rotater in FIG. 1. Moreover, FIG. 3 shows the sampling time offset calculator/sample output event manager outside of the general timing recovery feedback element 404.

While the invention has been described with reference to the exemplary embodiments thereof, those skilled in the art will be able to make various modifications to the described embodiments of the invention without departing from the true spirit and scope of the invention.

What is claimed is:

1. A timing recovery loop, comprising
   a filter adapted to receive In-Phase and Quadrature components of a received signal and to provide filtering to produce filtered In-Phase components and filtered Quadrature components;
   a squarer adapted to receive said filtered In-Phase components and said filtered Quadrature components and produce first and second squared outputs;
   a de-rotating integrator adapted to receive and de-rotate said first and second squared outputs, and to accumulate a squared complex signal;
   a phase estimator adapted to receive said squared complex signal and generate a phase error estimate;
   a phase locked loop adapted to receive and track said phase error estimate;
   a sample epoch estimator coupled to an output of said phase locked loop, adapted to produce a sample epoch based on a phase error estimate and a target baud rate; and
   an interpolator/decimator adapted to respond to said sample epoch by producing an interpolated sample between actual samples of a stream of samples, said interpolated sample, in combination with other interpolated samples, providing an interpolated sample stream at a rate equal to a multiple of said target baud rate.

2. The timing recovery loop in accordance with claim 1, wherein:
   said multiple is an integer multiple of said target baud rate.

3. The timing recovery loop in accordance with claim 1, further comprising:
   a phase estimator adapted to produce said phase error estimate;
   said sample epoch estimator being adapted to receive said phase error estimate and said target baud rate.

4. The timing recovery loop in accordance with claim 3, further comprising:
   a phase locked loop coupled between said phase estimator and said sample epoch estimator, said phase locked loop being adapted to track said phase error estimate.

5. A timing recovery loop, comprising:
   a filter adapted to receive In-Phase and Quadrature components of a received signal and to provide filtering to produce filtered In-Phase components and filtered Quadrature components;
   a squarer adapted to receive said filtered In-Phase components and said filtered Quadrature components and produce first and second squared outputs;
   a de-rotating integrator adapted to receive and de-rotate said first and second squared outputs, and to accumulate a squared complex signal;

a phase estimator adapted to receive said squared complex signal and generate a phase error estimate;

a phase locked loop adapted to receive and track said phase error estimate; and a sample epoch estimator coupled to an output of said phase locked loop, said sample epoch estimator adapted to output a sample epoch estimate based on a target baud rate and said phase error estimate.

6. The timing recovery loop in accordance with claim 5, wherein:

said filter is a Hilbert filter.

7. The timing recovery loop in accordance with claim 5, wherein:

said phase estimator is adapted to estimate said phase error estimate based on a frequency of a sign of a quadrature component of said squared complex signal.

8. A demodulator, comprising:

an analog-to-digital converter adapted to receive an analog signal and produce digital samples at a first, fixed frequency;

a digital demodulator adapted to receive said digital samples and separate said digital samples into In-Phase and Quadrature components, said digital demodulator operating at a second frequency;

an interpolator/decimator adapted to adjust a rate of representations of said In-Phase and Quadrature components to produce rate adjusted components at a third frequency;

a decimator adapted to decimate said rate adjusted components to produce decimated components at a fourth frequency; and a timing recovery loop adapted to generate a sample epoch to be provided to said interpolator/decimator;

wherein said timing recovery loop comprises:

a filter adapted to receive In-Phase and Quadrature components of a received signal and to provide filtering to produce filtered In-Phase components and filtered Quadrature components;

a squarer adapted to receive said filtered In-Phase components and said filtered Quadrature components and produce first and second squared outputs;

a de-rotating integrator adapted to receive and de-rotate said first and second squared outputs, and to accumulate a squared complex signal;

a phase estimator adapted to receive said squared complex signal and generate a phase error estimate;

a phase locked loop adapted to receive and track said phase error estimate; and a sample epoch estimator coupled to an output of said phase locked loop, said sample epoch estimator adapted to output a sample epoch estimate based on a target baud rate and said phase error estimate.

9. The demodulator according to claim 8, wherein said timing recovery loop comprises:

a sample epoch estimator adapted to output a sample epoch estimate based on a target baud rate and a phase error estimate.

10. The demodulator according to claim 8, further comprising:

a synchronizer adapted to receive said digital samples and synchronize said digital samples to a second frequency.

11. The demodulator according to claim 8, further comprising:

a bank of filters adapted to receive said In-Phase and Quadrature components and output filtered In-Phase components and filtered Quadrature components.

12. The demodulator according to claim 11, wherein:

said bank of filters operates on said received In-Phase and Quadrature components in an interleaved fashion.

13. The demodulator according to claim 12, further comprising:

a FIFO buffer adapted to receive and buffer said filtered In-Phase components and filtered Quadrature components.

14. The demodulator according to claim 8, further comprising:

a gain adjuster adapted to receive decimated components and produce gain adjusted components.

15. An integrated circuit including a timing recovery loop, comprising:

a filter adapted to receive In-Phase and Quadrature components of a received signal and to provide filtering to produce filtered In-Phase components and filtered Quadrature components;

a squarer adapted to receive said filtered In-Phase components and said filtered Quadrature components and produce first and second squared outputs;

a de-rotating integrator adapted to receive and de-rotate said first and second squared outputs, and to accumulate a squared complex signal;

a phase estimator adapted to receive said squared complex signal and generate a phase error estimate;

a phase locked loop adapted to receive and track said phase error estimate;

a sample epoch estimator coupled to an output of said phase locked loop, adapted to produce a sample epoch based on a phase error estimate and a target baud rate; and an interpolator/decimator adapted to respond to said sample epoch by producing an interpolated sample between actual samples of a stream of samples, said interpolated sample, in combination with other interpolated samples, providing an interpolated sample stream at a multiple of said target baud rate.

16. The integrated circuit including a timing recovery loop according to claim 15, wherein:

said multiple is an integer multiple of said target baud rate.

17. The integrated circuit according to claim 15, further comprising:

a phase estimator adapted to produce said phase error estimate;

said sample epoch estimator being adapted to receive said phase error estimate and said target baud rate.

18. The integrated circuit according to claim 17, further comprising:

a phase locked loop coupled between said phase estimator and said sample epoch estimator, said phase locked loop being adapted to track said phase error estimate.

19. A method of adjusting a baud rate with respect to a sample stream, comprising:

filtering to receive In-Phase and Quadrature components of a received signal and to provide filtering to produce filtered In-Phase components and filtered Quadrature components;

squaring said receive said filtered In-Phase components and said filtered Quadrature components and produce first and second squared outputs;

de-rotating integrating adapted to receive and de-rotate said first and second squared outputs, and to accumulate a squared complex signal;

calculating a phase error estimate based on an analysis of In-Phase components and Quadrature components corresponding to quadrature amplitude modulated samples;

phase locking to receive and track said phase error estimate; and calculating a sample epoch based on a phase error estimate and a target baud rate.

20. The method of adjusting a baud rate with respect to a sample stream according to claim 19, further comprising:

sampling said quadrature amplitude modulated samples at a fixed sampling rate.

21. The method of adjusting a baud rate with respect to a sample stream according to claim 19, further comprising:

interpolating a sample within said sample stream based on said sample epoch.

22. Apparatus for adjusting a baud rate with respect to a sample stream, comprising:

filtering to receive In-Phase and Quadrature components of a received signal and to provide filtering to produce filtered In-Phase components and filtered Quadrature components;

squaring said receive said filtered In-Phase components and said filtered Quadrature components and produce first and second squared outputs;

de-rotating integrating adapted to receive and de-rotate said first and second squared outputs, and to accumulate a squared complex signal;

means for calculating a phase error estimate based on an analysis of In-Phase components and Quadrature components corresponding to quadrature amplitude modulated samples;

phase locking to receive and track said phase error estimate; and means for calculating a sample epoch based on a phase error estimate and a target baud rate.

23. The apparatus for adjusting a baud rate with respect to a sample stream according to claim 22, further comprising:

means for sampling said quadrature amplitude modulated samples at a fixed sampling rate.

24. The apparatus for adjusting a baud rate with respect to a sample stream according to claim 22, further comprising:

means for interpolating a sample within said sample stream based on said sample epoch.

* * * * *